US007353030B2

United States Patent
Singh

(12) United States Patent
(10) Patent No.: US 7,353,030 B2
(45) Date of Patent: Apr. 1, 2008

(54) SYSTEMS AND METHODS FOR HANDOVERS BETWEEN BASE RADIOS

(75) Inventor: Lakhbir Singh, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 32 days.

(21) Appl. No.: 11/192,120

(22) Filed: Jul. 29, 2005

(65) Prior Publication Data

US 2007/0026864 A1 Feb. 1, 2007

(51) Int. Cl.
 *H04Q 7/20* (2006.01)
(52) U.S. Cl. ............ 455/442; 455/436; 455/437; 455/439; 455/453; 455/561; 455/562.1; 370/329; 370/331; 370/332; 370/333
(58) Field of Classification Search ........ 455/436, 455/437, 438, 439, 440, 441, 442, 443, 444, 455/445, 450, 451, 452.1, 452.2, 453, 512, 455/522, 524, 446, 561, 562.1; 370/331, 370/332, 333
See application file for complete search history.

(56) References Cited

U.S. PATENT DOCUMENTS

| 4,670,899 | A | * | 6/1987 | Brody et al. ............ 455/453 |
| 6,041,235 | A | * | 3/2000 | Aalto ..................... 455/437 |
| 6,119,004 | A | * | 9/2000 | Yamada et al. ............ 455/436 |
| 6,125,106 | A | * | 9/2000 | Ostrup et al. ............ 370/230 |
| 6,202,059 | B1 | * | 3/2001 | Thompson et al. ........... 706/46 |
| 6,266,531 | B1 | * | 7/2001 | Zadeh et al. ............ 455/453 |
| 6,347,226 | B1 | * | 2/2002 | Virtanen ................. 455/450 |
| 6,359,867 | B1 | * | 3/2002 | Ali-Vehmas ............. 370/331 |
| 6,363,252 | B1 | * | 3/2002 | Hamalainen et al. ........ 455/436 |
| 6,473,614 | B1 | * | 10/2002 | Quensel et al. ............ 455/436 |
| 6,584,330 | B1 | * | 6/2003 | Ruuska ................. 455/574 |
| 6,963,746 | B2 | * | 11/2005 | Sato et al. ............. 455/450 |
| 6,968,192 | B2 | * | 11/2005 | Longoni ............... 455/453 |
| 7,013,141 | B2 | * | 3/2006 | Lindquist et al. ........ 455/435.1 |
| 2003/0129982 | A1 | * | 7/2003 | Perini .................. 455/442 |
| 2006/0166677 | A1 | * | 7/2006 | Derakshan et al. ......... 455/453 |

* cited by examiner

Primary Examiner—Rafael Perez-Gutierrez
Assistant Examiner—Olumide Ajibade-Akonai

(57) ABSTRACT

A system and method for reducing power consumption and interference in a communications system that has multiple base radios. A base radio controller assigns priorities to the base radios in the system. When higher priority base radios have excess capacity, intracell handovers are used to consolidate communications from lower priority base radios to higher priority base radios. After transferring communications to higher priority base radios, the lower priority base radios can attenuate or shut off their transmitted signal in order to reduce or eliminate all the interference they cause other base stations in the system, and reduce transmission power requirements.

16 Claims, 2 Drawing Sheets

SYSTEMS AND METHODS FOR HANDOVERS BETWEEN BASE RADIOS

BACKGROUND OF THE INVENTION

Figure 1:
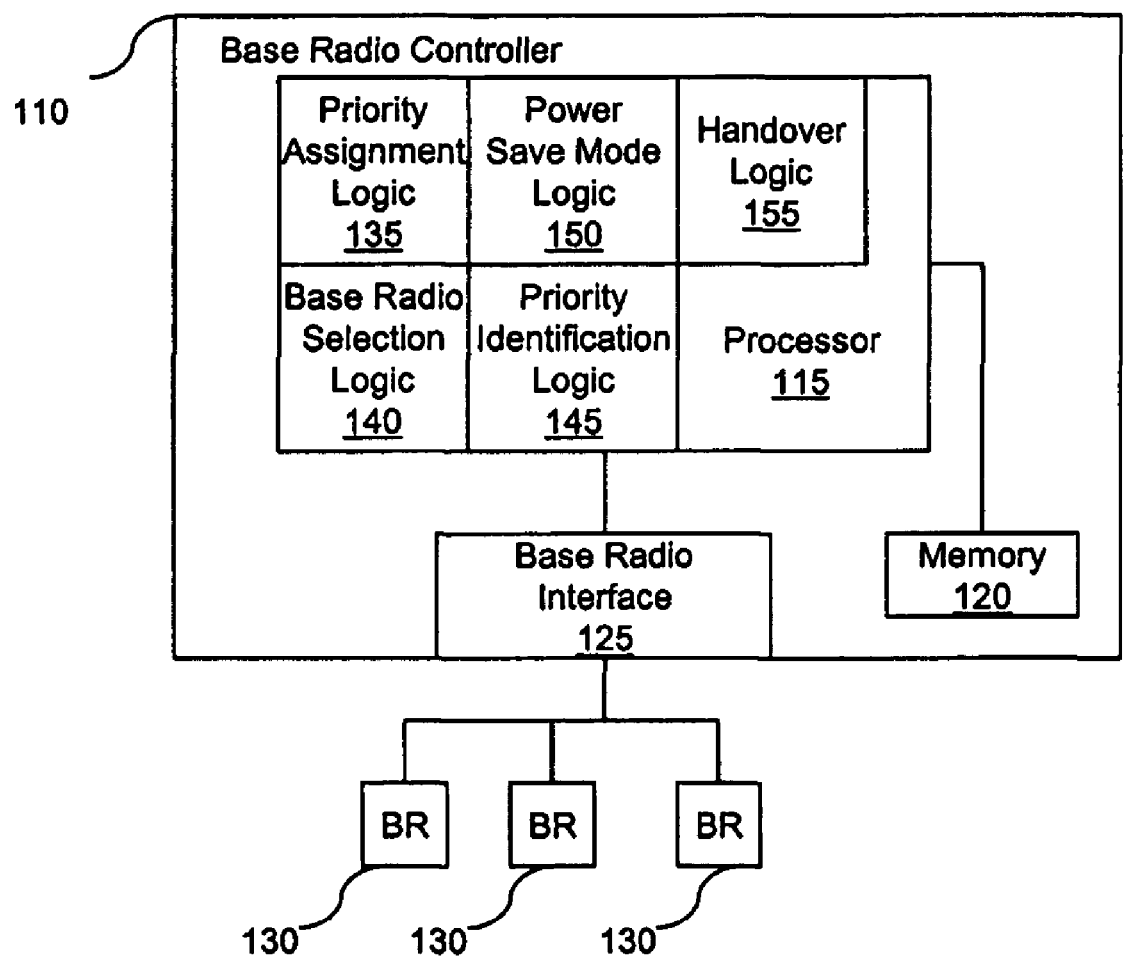

In wireless communications networks mobile stations communicate with base stations using a wireless communications protocol. One exemplary wireless communication protocol is time division multiple access (TDMA), in which multiple calls are supported in a single frequency band by assigning one or more unique time slots to each call. A cellular network is a wireless communication network which is divided into a number of cells, each of which includes a base station. Each base station includes a number of base radios, each being assigned a unique frequency. Through careful allocation of the frequencies assigned to the various base radios of the base stations in a network, frequency reuse patterns can be designed to reduce the level of interference that the base radios of one base station have with the base radios of other base stations in the network. However, the interference cannot be completely eliminated if two nearby base radios are transmitting at the same frequency, which is commonly referred to as co-channel interference, or on adjacent frequencies, which is commonly referred to as adjacent channel interference.

Current cellular networks try reduce interference and electrical power consumption by attenuating the transmit power of unused base radios. However, often a relatively few number of calls are spread across multiple base radios. If there is only a single call assigned to a particular base radio, that base radio would not be able to attenuate its signal. In addition, having a large number of base radios loaded with only a few calls per base radio is an inefficient use of electrical power because, for example, three base radios supporting only three calls consumes a much greater amount of electrical power than one base radio supporting three calls.

In view of the above-identified and other deficiencies of conventional cellular networks, it is desirable to implement systems and methods for reducing electrical power consumption and interference in wireless communication systems.

SUMMARY OF THE INVENTION

The present invention provides systems and methods for reducing power consumption and interference in communication networks with multiple base radios. In accordance the present invention, a base radio controller assigns priorities to the base radios in the network. When higher priority base radios have excess capacity, intracell handovers are used to consolidate communications from lower to higher priority base radios. Accordingly, the lower priority base radios can attenuate or shut off their transmitted signal in order to reduce or eliminate all the interference they cause other base stations in the system, as well as to reduce their power consumption.

Other objects, advantages and novel features of the present invention will become apparent from the following detailed description of the invention when considered in conjunction with the accompanying drawings.

BRIEF DESCRIPTION OF THE DRAWING FIGURES

Figure 2:
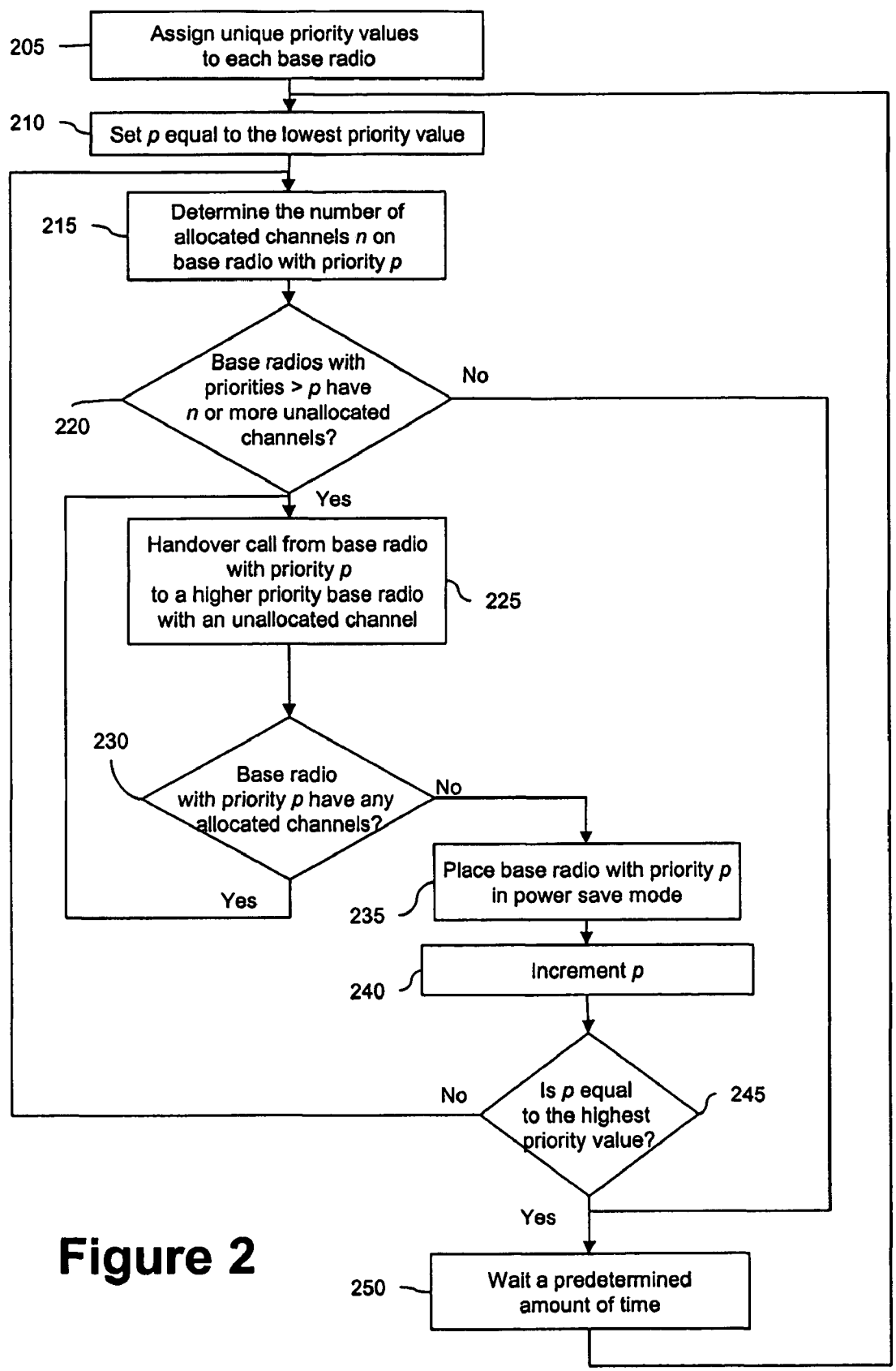

FIG. 1 is a block diagram of an exemplary base radio controller in accordance with the present invention; and FIG. 2 is a flow diagram illustrating an exemplary method of using intracell base radio handovers to utilize excess capacity of higher priority base radios in accordance with the present invention.

DETAILED DESCRIPTION OF THE PREFERRED EMBODIMENTS

FIG. 1 is a block diagram illustrating an exemplary base radio controller 110 in accordance with the present invention. The base radio controller includes processor 115, which communicates with a plurality of base radios 130 via base radio interface 125. Processor 115 includes priority assignment logic 135, base radio selection logic 140, priority identification logic 145, power save mode logic 150, and handover logic 155, all of which will be described in more detail below. Processor 115 can be a microprocessor running program code, an application specific integrated circuit (ASIC), field programmable gate array (FPGA), or the like.

Memory 120 is coupled to the processor 115, and can be used for storing the priorities of each of the base radios, storing a program for operating processor 115, and/or other conventional functions of a base radio controller memory. Memory 120 can be random access memory, read only memory, flash memory, a hard drive and/or the like.

FIG. 2 is a flow diagram illustrating an exemplary method of using base radio handovers to utilize excess capacity of higher priority base radios in accordance with the present invention. Initially, each base radio is assigned a unique priority value by the priority assignment logic 135 (step 205).

Next, the base radio selection logic 140 initializes the priority value p to the priority value of the lowest priority base radio (step 210), and the processor 115 determines the number of allocated channels for the base radio with priority p (step 215). The priority identification logic 145 then determines if the base radios with priorities greater than p have sufficient unallocated channels to accommodate all of the calls currently being handled by the base radio with priority p (step 220). If there are not enough channels to accommodate all the calls ("No" path out of decision step 220), then the base radio controller waits a predetermined amount of time (step 250) and repeats the optimization process.

When there are sufficient higher priority base radios to which calls can be transferred ("Yes" path out of decision step 220), the handover logic 155 proceeds to handover a call from the base radio with priority p to a higher priority base radio with unallocated channels (step 225). The higher priority base radio can be any higher priority base radio, or can be the highest priority base radio with an unallocated channel. The latter results in the fewest overall handover operations required to optimize the base radios. The base radio controller then determines if the base radio with priority p has any more allocated channels (step 230). If base radio with priority p has any remaining allocated channels ("Yes" path out of decision step 230), remaining unallocated channels are handed over to another higher priority base radio (step 225) until all the channels of the base radio with priority p are unallocated.

When all of the base radio's channels are allocated to higher priority base radios, the power save mode logic 150 can place the base radio in power save mode (step 235). The power save mode can include completely shutting off the transmitted signal or attenuating the transmitted signal. Due to the amount of time required to power up the base radio after it has been shut off, attenuating the signal may be preferable when loading of the channels changes rapidly. The value of p is then incremented (step 240), and if p is now equal to the priority value of the highest priority base radio (step 245), then ("Yes" path out of step 245) the optimization is complete (step 250). Otherwise ("No" path out of step 245) the optimization continues for the next base radio with priority p.

The system and method described above has the effect of reducing power consumption and interference in a wireless network that has multiple base radios. Using intracell handovers to consolidate communications from lower to higher priority base radios allows the lower priority base radios to enter a power save mode in order to reduce or eliminate the interference they cause other base stations in the network and to reduce their power consumption.

Further reduction of the co-channel and adjacent channel interference can be obtained by assigning priorities based on actual measurements of the level of interference caused by each base radio using known propagation modeling techniques. Base radios causing more interference can be given low priority values, while base radios causing less interference can be given higher priority values.

Because permanent priority assignments may, due to the increased usage, increase the failure rates for the high priority base radios, priorities can be periodically changed to equalize the usage of individual base radios, thereby spreading the usage across all the base radios. Reassignment of priorities can also involve reassignment of frequencies to reduce co-channel and adjacent channel interference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling base radios, comprising the acts of:
   assigning priority values to a plurality of base radios;
   selecting a first base radio with a first priority value;
   determining whether a base radio with a priority value which is higher than the first priority value has excess capacity;
   handing over communications from the first base radio to the base radio with a higher priority when it is determined that the base radio with the higher priority has excess capacity, wherein the handover is an intracell handover; and
   periodically modifying the priority values to equalize usage of the base radios.

2. The method of claim 1, further comprising the acts of:
   determining whether all channels of the first base radio are unallocated; and
   placing the first base radio in a power save mode when all of its channels are unallocated.

3. The method of claim 2, wherein the power save mode attenuates a transmission power of the first base radio.

4. The method of claim 2, wherein the first base radio is powered off in the power save mode.

5. The method of claim 1, wherein the base radio with the higher priority has a highest priority value of a plurality of base radios.

6. The method of claim 1, wherein the first base radio causes more interference to other base radios in the network than the base radio with the higher priority value.

7. The method of claim 1, wherein when all channels of the first base radio are unallocated, the method further comprising the acts of:
   selecting a second base radio with a second priority value;
   determining whether a base radio with a priority value which is higher than the second priority value has excess capacity; and
   handing over communications from the second base radio to the base radio with a higher priority when it is determined that the base radio with the higher priority has excess capacity.

8. A base radio controller, comprising:
   a base radio interface that communicates with a plurality of base radios;
   a processor, coupled to the base radio interface, which comprises
      base radio selection logic for selecting a first base radio with a first priority value;
      priority identification logic for identifying a base radio with a priority value which is higher than the first priority value that has excess capacity;
      handover logic for handing over communications from the lower priority base radio to a higher priority base radio when it is determined that the higher priority base radio has excess capacity, wherein the handover is an intracell handover; and
      priority assignment logic for assigning priority values to a plurality of base radios, wherein the priority assignment logic periodically changes the priority values to equalize usage of each of the plurality of base radios.

9. The base radio controller of claim 8, wherein the processor further comprises:
   power save mode logic for determining whether all channels of the first base radio are unallocated, and placing the first base radio in a power save mode when all of its channels are unallocated.

10. The base radio controller of claim 9, wherein the power save mode logic attenuates the transmission power of the first base radio.

11. The base radio controller of claim 9, wherein the power save mode logic causes the first base radio to power off when in the power save mode.

12. The base radio controller of claim 8, wherein the higher priority base radio has a highest priority value of the plurality of base radios with excess capacity.

13. The base radio controller of claim 8, wherein the priority assignment logic assigns lower priority values to the base radios that cause more interference to other base radios in a network.

14. The base radio controller of claim 8, wherein the first base radio causes more interference to other base radios in the network than the base radio with the higher priority value.

15. The base radio controller of claim 8, wherein when all channels of the first base radio are unallocated, the base radio selection logic selects a second base radio with a second priority value, the priority identification logic identifies a base radio with a priority value which is higher than the second priority value that has excess capacity, and the handover logic hands over communications from the second base radio to a higher priority base radio when it is determined that the higher priority base radio has excess capacity.

16. A method for controlling base radios, comprising the acts of:
   assigning priority values to a plurality of base radios based on interference caused by each base radio to other base radios of the plurality of base radios;
   selecting a first base radio with a first priority value;
   determining whether a base radio with a priority value which is higher than the first priority value has excess capacity;
   handing over communications from the first base radio to the base radio with a higher priority when it is determined that the base radio with the higher priority has excess capacity, wherein the handover is an intracell handover, wherein the first base radio causes more interference to other base radios in the network than the base radio with the higher priority value, and wherein the interference caused by the first base radio is determined using propagation modeling techniques.

* * * * *